United States Patent [19]

Akutagawa et al.

[11] Patent Number: 4,972,731
[45] Date of Patent: Nov. 27, 1990

[54] ROBOT FOR CLEAN ROOM USE HAVING CONTAMINANT PARTICLE-REMOVAL SYSTEM INCORPORATED THEREIN

[75] Inventors: Mitsuo Akutagawa, Tsuchiura; Takashi Kuramochi, Tsukuba, both of Japan

[73] Assignee: Texas Instruments Incorporated, Dallas, Tex.

[21] Appl. No.: 326,340

[22] Filed: Mar. 21, 1989

[30] Foreign Application Priority Data

Mar. 22, 1988 [JP] Japan .................................. 63-67631

[51] Int. Cl.$^5$ ............................................ G05G 11/00
[52] U.S. Cl. ..................................... 74/479; 98/115.3; 901/16; 901/23; 901/28; 901/50; 403/410; 285/119; 285/425
[58] Field of Search ................ 285/119, 122, 123, 124, 285/125, 126, 127, 13, 14, 425; 901/14, 15, 16, 17, 18, 28, 50, 49, 23; 414/728; 98/115.3; 74/479; 15/300 R, 300 A, 304; 403/410

[56] References Cited

U.S. PATENT DOCUMENTS

| 1,664,125 | 3/1928 | Lowrey | 285/13 |
| 2,752,197 | 6/1956 | Marco | 285/122 X |
| 4,253,684 | 3/1981 | Tolbert et al. | 285/13 |
| 4,555,216 | 11/1985 | Buschor | 414/728 |
| 4,637,301 | 1/1987 | Shields | 98/115.3 |
| 4,683,912 | 8/1987 | Dubrosky | 265/134 X |
| 4,770,680 | 9/1988 | Mochida et al. | 98/115.3 X |
| 4,904,153 | 2/1990 | Iwasawa et al. | 98/115.3 X |

Primary Examiner—Dave W. Arola
Attorney, Agent, or Firm—William E. Hiller; N. Rhys Merrett; Melvin Sharp

[57] ABSTRACT

Multi-jointed robot for use in a clean room specifically applicable during the production of semiconductor devices where contaminant material must be eliminated to the extent possible. The robot includes a sectional body defined at least in part by a plurality of arm members wherein a plurality of pivotal joints are provided to pivotably connect adjacent arm members with respect to each other. The arm members and the pivotal joints are hollow such that an uninterrupted air passage is provided in the robot extending through each of the pivotal joints and the arm members of the sectional body thereof. The robot includes a terminal arm member located at one end of the sectional body which has an opening on the exterior surface thereof defining one end of the air passage through the robot. A rotary fan is mounted in the robot at the other end of the air passage and is operable upon rotation to exhaust air through the air passage within the interior of the sectional body of the robot. The air flow along the passage within the interior of the sectional body of the robot carries any contaminant particles if present due to frictional wear between moving components of the pivotal joints along the air passage to the exterior of the sectional body of the robot, thereby removing the particles as a source of contamination.

5 Claims, 3 Drawing Sheets

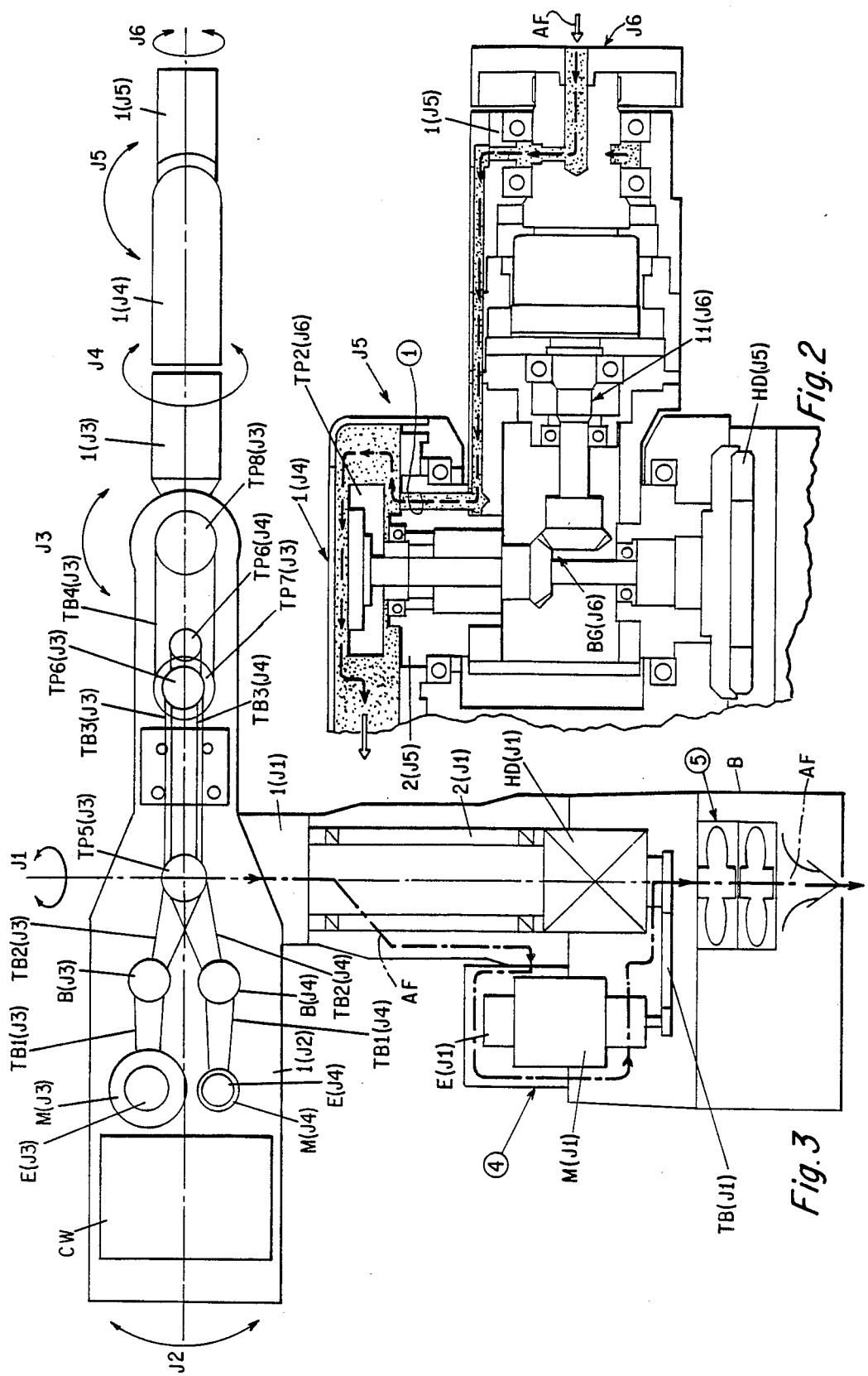

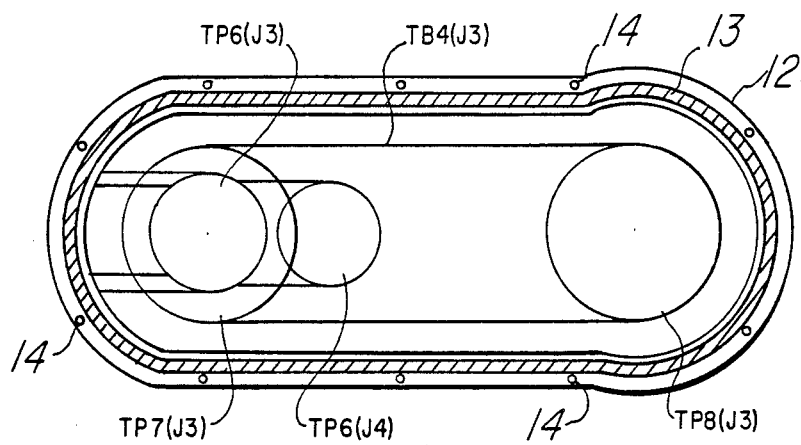
Fig.4
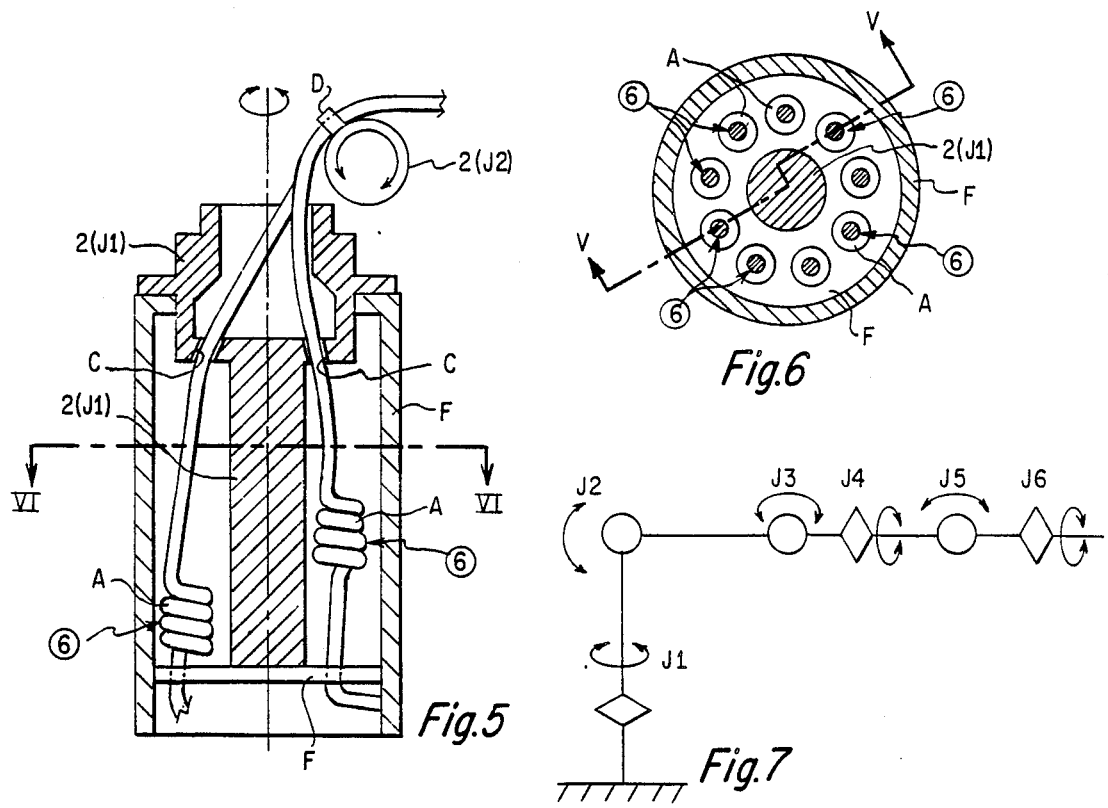
Fig.5
Fig.6
Fig.7

ROBOT FOR CLEAN ROOM USE HAVING CONTAMINANT PARTICLE-REMOVAL SYSTEM INCORPORATED THEREIN

DETAILED DESCRIPTION OF THE INVENTION

1. Field of use in Industry

This invention relates to a robot, and particularly to, for example, a six-axis vertical multi-joint robot suitable for a clean room.

2. Prior Art

In order to meet a requirement that an IC (Intergrated Circuit) to which semiconductor techniques are used freely becomes high-efficient and highly-integrated, impurities such as dirt, dust and the like, must be prevented as much as possible from mixing in the process during the production of the semiconductor device, to process the semiconductor while keeping it of high-purity. Thus, in the past, it attracted public attention that semiconductor processing in a clean room was done not by a human being but by a robot, and this has been actually realized.

In such a clean room robot, although minute particles are apt to be generated inside its arm parts, the minute particles in the arm parts are entirely forced to flow out to the outside of the arm parts by using a vacuum pipe or the like, which is provided in a facility for exhausting them. In the exhausting system, since pipings for drawing are needed to be trained upon the outside of the arm parts on movable parts around joints of the robot, it all the worse causes the generation of the minute particles on the outside of the robot. Furthermore, the exhausting system as above in which the vacuum and the like are used, also disturbs elasticity or movability of the robot arm part itself.

PURPOSE OF THE INVENTION

An object of the invention is to provide a robot with a structure wherein the cleanliness of the robot can be increased and the robot function can be improved.

CONSTITUTION OF THE INVENTION

This invention relates to a robot having holes for leading the air through the inside of arm parts provided at joints between the arm parts, and an exhausting means for exhausting minute particles in said arm parts through the holes to the outside along with the flow of said air.

BRIEF DESCRIPTION OF THE DRAWINGS

FIGS. 1-7 show an embodiment wherein the invention is applied to a six-axis vertical multi-joint robot:

FIG. 1 is a plan view of a robot;
FIG. 2 is an enlarged plan view of a part of the same robot;
FIG. 3 is a front view of the same robot;
FIG. 4 is an enlarged view when a part of FIG. 3 is provided with a cover;
FIG. 5 is a cross-sectional view in which cables are arranged in an output axis;
FIG. 6 is a cross-sectional view taken along with the line VI—VI of FIG. 5; and
FIG. 7 is a view showing a combination of each joint in broad outline.

In reference numerals shown in the figures:

Figure 1:
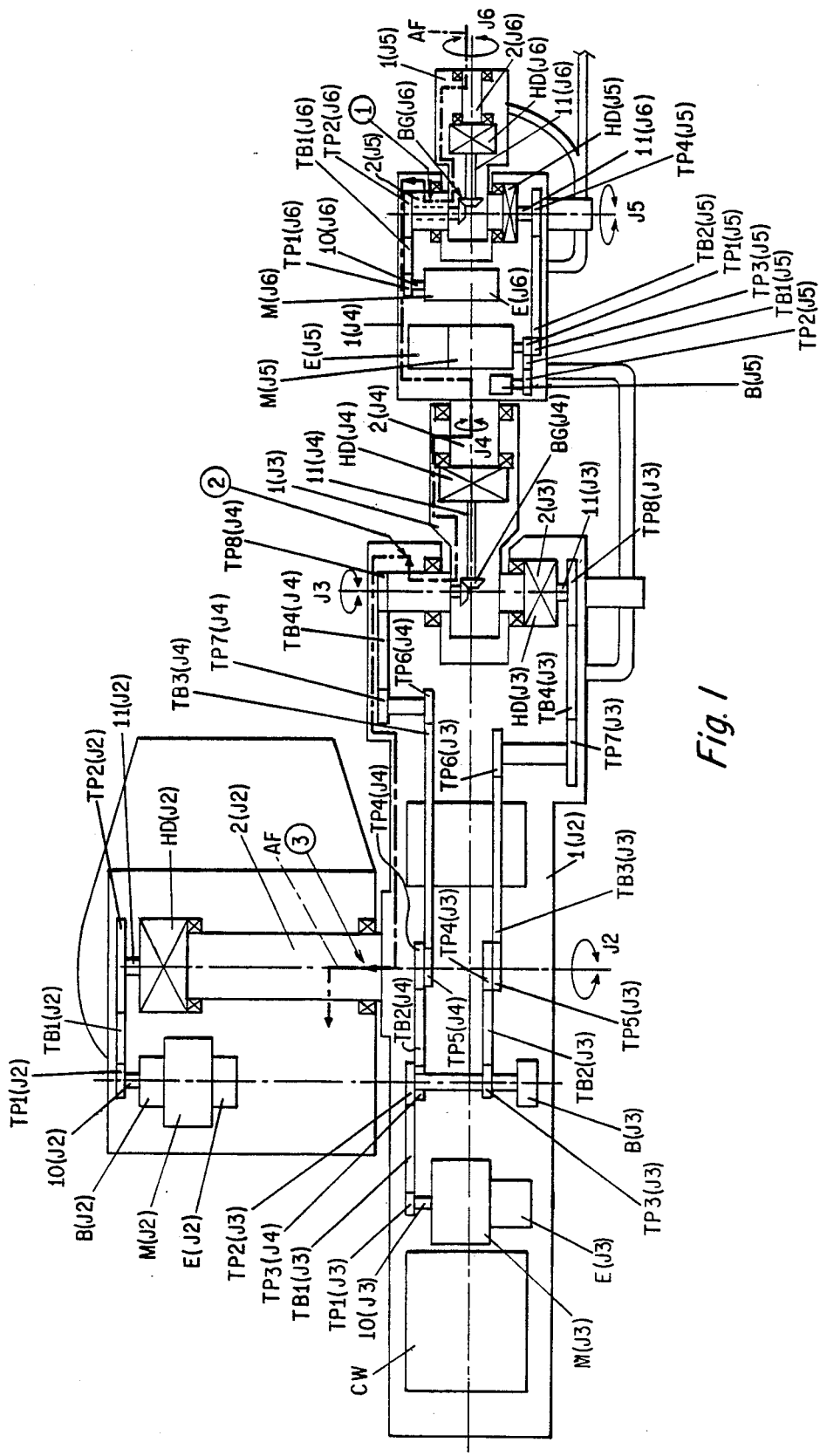

1(J1), 1(J2), 1(J3), 1(J4), and 1(J5) . . . arm part;
2(J1), 2(J2), 2(J3), 2(J4), 2(J5), and 2(J6) . . . output axis;
10(J2), 10(J3), 10(J4), 10(J5), and 10(J6) . . . rotation axis;
11(J2), 11(J3), 11(J4), 11(J5), and 11(J6) . . . input axis;
HD(J1), HD(J2), HD(J3), HD(J4), HD(J5), and HD(J6) . . . harmonic drive;
M(J1), M(J2), M(J3), M(J4), M(J5), and M(J6) . . . motor;
TP1(J2), TP2(J2), TP1(J3), TP2(J3), TP3(J3), TP4(J3), TP5(J3), TP6(J3), TP7(J3), TP8(J3), TP1(J4), TP2(J4), TP3(J4), TP4(J4), TP5(J4), TP6(J4), TP7(J4), TP8(J4), TP1(J5), TP2(J5), TP3(J5), TP4(J5), TP1(J6), and TP2(J6) . . . timing pulley;
TB(J2), TB1(J3), TB2(J3), TB3(J3), TB4(J3), TB1(J4), TB2(J4), TB3(J4), TB4(J4), TB1(J5), TB2(J5), and TB2(J6) . . . timing belt;
BG(J4) and BG(J6)—bevel gear;
J1, J2, J3, J4, J5, and J6 . . . joint;
AF . . . air flow;
(1), (2), (3), and (4) . . . hole for passing air;
(5) . . . fan; and
(6) . . . cable.

THE EMBODIMENT

Hereinafter, the embodiment of the invention will be described.

FIGS. 1-7 shows an embodiment wherein the invention is applied to a six-axis vertical multi-joint robot.

FIG. 1 is a plan view of a robot in accordance with this embodiment; FIG. 3 is a plan view of the same robot; and the joints associated with the respective arm parts of this robot will be now described.

In a first joint J1, a motor M(J1) having an encoder E(J1) rotationally and horizontally drives an output axis 2(J1) via a harmonic drive HD(J1). The joint J1 itself is almost vertically fixed, and the output axis 2(J1) and the motor M(J1) are connected via a timing belt TB(J1).

In a second joint J2, the driving force of a motor M(J2) with an encoder E(J2) is transmitted via a rotation axis 10(J2) with a brake B(J2), a timing pulley TP1(J2), a timing belt TB(J2), a timing pulley TP2(J2), and a harmonic drive HD(J2), to an output axis 2(J2). The output axis 2(J2) is driven rotationally along a vertical plane. In this joint J2 which is similar to joints described later and each having an output axis for rotating along the vertical plane, an input axis 11(J2) of the harmonic drive HD(J2) is placed on the opposite side of the output axis 2(J2) on the side of the arm part 1(J2), and the input axis 11(J2) and the rotation axis 10(J2) of the motor M(J2) are indirectly connected by the pulley TP1(J2), the belt TB(J2), and the pulley TP2(J2) which are used as a transmission means. 1(J2) in the figure represents an arm part which is vertically rotated with the output axis 2(J2) of the joint J2.

In a third joint J3, a rotation axis 10(J3) of a motor M(J3) with an encoder E(J3) is connected via a timing pulley TP1(J3), a timing belt TB1(J3), a timing pulley TP2(J3), a rotation axis 12(J3) with a brake B(J3), a timing pulley TP3(J3), a timing belt TB2(J3), a timing pulley TP4(J3), a timing pulley TP5(J3), a timing belt TB3(J3), a timing pulley TP6(J3), a timing pulley TP7(J3), a timing belt TB4(J3), and a timing pulley TP8(J3), to an input axis 11(J3) of a harmonic drive HD(J3). The harmonic drive HD(J3) rotates an output axis 2(J3) on the side of an arm part 1(J3) along a vertical plane, rotating the arm part 1(J3) along therewith.

In a fourth joint J4, a rotation axis 10(J4) of a motor M(J4) with an encoder E(J4) is connected via a timing pulley TP1(J4), a timing belt TB1(J4), a timing pulley TP2(J4), a rotation axis 12(J4) with a brake B(J4), a timing pulley TP3(J4), a timing belt TB2(J4), a timing pulley TP4(J4), a timing pulley TP5(J4), a timing belt TB3(J4), a timing pulley TP6(J4), a timing pulley TP7(J4), a timing belt TB4(J4), a timing pulley TP8(J4), and a bevel gear BG(J4), to an input axis 11(J4) of a harmonic drive HD(J4). Through the harmonic drive HD(J4), an output axis 2(J4) is rotated along a vertical plane.

With a fifth joint J5, a rotation axis 10 of a motor M(J5) with an encoder E(J5) is, on the one hand, connected via a timing pulley TP1(J5), a timing belt TB1(J5), and a timing pulley TP2(J5), to a brake B(J5). On the other hand, the rotation axis 10(J5) is connected via a timing pulley TP3(J5), a timing belt TB2(J5), and a timing pulley TP4(J5), to an input axis 11(J5) of a harmonic drive HD(J5). An output axis 2(J5) of the harmonic drive HD(J5) rotates an arm part 1(J5) along a vertical plane.

In a sixth joint J6, a rotation axis 10(J6) of a motor M(J6) with an encoder E(J6) is connected via a timing pulley TP1(J6), a timing belt TB1(J6), a timing pulley TP2(J6), and a bevel gear BG(J6), to an output axis 11(J6) of a harmonic drive HD(J6). An output axis 2(J6) is rotated along a vertical plane to function as a final output axis.

In this embodiment, each of the six joints J1-J6 described above is concretely combined as shown in FIGS. 1 and 3, to constitute a vertical multi-joint robot for a clean room, for example. The outline of the combination is shown in FIG. 7. In the figures, each arm part on the side of the output axis associated with each joint is indicated as 1(J1), 1(J2), 1(J3), 1(J4), and 1(J5). The third joint J3 and the fourth joint J4 partly overlap each other in the vertical direction. In the position of the left end of the figures of this robot, counter weight CW is provided for total balance. The respective motors M(J1)-M(J6) may be operated independently or synchronously with timing.

In the multi-joint robot for the clean room in accordance with the embodiment described above, it is a noticeable constitution that holes for passing air shown by (1), (2), (3), and (4) are respectively formed at the joints between the respective arms, through which an air flow AF through the inside of the robot arms is generated as shown by the section line (the chain line with one point), exhausting the minute particles in the arm parts IN the air flow to the outside.

In FIG. 2, the hole (1) for passing air at the joint J5 is shown, and in the joint J5 between the arm parts 1(J5)-1(J4), the air AF which is introduced from the outside of the arm part 1(J5) passes through the periphery of a shaft of the bevel gear BG(J6) to the hole (1) for passing which pierces through the output axis 2(J5) of the joint J5, and then enters into the inside of the arm part 1(J4). (2) and (3) in FIG. 1 and (4) in FIG. 3 are formed as the same holes for passing air with (1) above, so that the air flow AF is successively transmitted from the arm part 1(J4) to 1(J3)→1(J2)→1(J1), and finally from the periphery of the motor M(J1) to a fan (5) of a base B, which exhausts the air flow AF to the outside.

Therefore, the operation of the fan (5) makes the pressure of the entire inside of the robot arm negative, and the air flow AF described above is therewith generated through the hole for passing of each joint, so that the minute particles generated in the inside of the arms by the joint parts, the belts and the like, can be effectively exhausted from the inside of the arms to outer ducts, increasing the cleanliness of the robot. On the contrary, conventional methods are apt to pile the minute particles on the arm parts and the semiconductor products or to sprinkle them in the clean room immediately after drawing them to the outside of the arm parts, but such a case can be prevented in this embodiment. In the above exhausting system in accordance with the embodiment, the existing vacuum facilities below the fan (5) may be used for the drawing paths, or the minute particles may be carried on the existing downflow; and in either case, the fan (5) will not blow the particles upward while exhausting them.

Since the robot of this embodiment is made so as to be capable of effectively exhausting the minute particles in the arm parts, there is no difficulty in passing wiring cables in conjunction with the joints, especially J1 and J2, through the inside of the arm parts. That is, the wiring cables (6) are located around the output axes 2(J1) and 2(J2) of the joints J1 and J2 in FIGS. 5 and 6, and the minute particles generated due to the friction between the respective cables and the like can be also led on the above air flow AF to the side of the fan (5). Further in the case, each cable (6) has a curl characteristic (part A) as shown in the figure, its lower end is fixed to a frame part F of the joint J1, and its upper end is fixed through a hole C to the output axis 2(J2) by a fixing metal fitting D. The curl parts A are made so as to be capable of alternately shifting their positions up and down between the adjacent cables.

In that case, cases become few that the cables (6) are rubber against each other in the arm parts during the arm part operation, and the cables are always strained by the curl parts A to decrease interference with the axis 2(J1), so that the generation of the minute particles due to the cables (6) can be controlled to be extremely small. This can be further decreased, if the surfaces of the ouput axis 2(J1) and a frame F are coated with fluoric resin. Since the cables (6) pass through the inside of the arm parts, it is not needed to draw the cables around the outside, and bad influences due to it can be prevented.

In this embodiment, as shown in FIG. 4, for example, when fixing a cover 12 for covering the side faces of the belts, pulleys and the like, the cover 12 is fixed via a packing 13 of urethane rubber and the like in order to maintain its airtightness (and 14 in the figure is a screw hole). Therefore, the minute particles generated in the arm part (1(J2) herein), can be exhausted only by the above air flow AF without leaking out of the robot. This airtight seal structure can be similarly applied to other parts, and the covers in the peripheral regions of the above motors M(J1), M(J5) and the like may be formed in the same manner.

As a method of processing the minute particles generated from the bevel gears, motors, belts and the like described above, instead of using the holes provided in the inside described above, it may be also thought that a vacuum, fan, and the like set up in the facility to exhaust the minute particles generated inside by providing a tube in the outside and the like. In this case, the tube is bent, pulled, or the like, so that the environment is capable of increasing the minute particles instead.

With the robot of this embodiment, the harmonic drives are used for all of the respective output axes, so that the backlash can be removed to improve positioning accuracy. While the bevel gears BG(J4) and BE(J6) are used in one part, they are used in the input sides of the respective harmonic drives HD(J4) and HD(J6), and thus, good accuracy is maintained not to precipitate any problems. By respectively using the harmonic drives, a high rate of speed reduction can be set, and therefore, the power of the motors can be reduced in comparison with the same payload to reduce the weight of the robot itself at this rate.

In the robots which have been considered until now, the weight of the motor itself is taken into account as load torque, but it is not needed in this embodiment. That is, the input axis of the harmonic drive is arranged on the side opposite to the output side, and the driving force of the motor on the other position is transmitted via the timing belt to the input axis, so that the harmonic drive and the motor can be set apart from each other to do torque calculation of the motor without considering the weight of the motor. Furthermore, weighty things, such as the motors, brakes and the like which are used for driving, can be moved from the arm part to the robot support side (i.e., the opposite ends of the rotation axis of the arm part), and thus the weight can be distributed to the both sides, so that not only can the torque of the motor be decreased, but also the counter weight CW (see FIGS. 1 and 3) can be reduced or omitted to reduce the total weight of the entire robot and be suitable for a moving robot. The inertial force is decreased, so that the operation of the arm part can be immediately stopped when braking to be of advantage in making the operation quick and accurate. Additionally, because of being well-balanced and light, the arm part is stable against falling even when the power is turned off.

While the invention has been illustrated hereabove, the above embodiment can be further modified according to the technical thought of the invention.

For example, the position, number, and further exhausting means of the holes for passing air described above may be variously modified, and the structure of the above respective arm parts or joints, the power transmitting means, the kind and the arrangement of the respective part materials, and the like may be variously modified. Even when the robot is formed as a horizontal multi-joint robot, as well as of the above vertical multi-joint type, the invention can be applied.

EFFECTS OF THE INVENTION

In this invention, since the minute particles in the arm parts are exhausted through the holes of the joints to the outside, as described above, the minute particles in the arm parts can be effectively exhausted without scattering and the like, increasing the cleanliness. Drawing around of the wiring, piping and the like in the outside of the robot can be reduced, making the function of the robot excellent.

What is claimed is:

1. A multi-joined robot for use in a clean room where contaminant material must be eliminated to the extent possible, said robot comprising:
    a sectional body defined at least in part by a plurality of arm members;
    means including relatively movable components pivotably connecting adjacent arm members with respect to each other and providing a plurality of pivotal joints between respective arm members;
    said arm members and said pivotal joints being at least partially hollow to define an uninterrupted tortuous passage extending through each of said pivotal joints and the arm members of said sectional body; and
    means providing an air flow within the interior of said sectional body of said robot through said tortuous passage defined in said pivotal joints and said arm members pivotably connected thereby;
    whereby contaminant particles if present due to frictional wear between moving components of said pivotal joints may be carried by the air flow along said tortuous passage within the interior of said sectional body of said robot to the exterior of said sectional body to remove said particles as a source of contamination.

2. A robot as set forth in claim 1 wherein one of said plurality of arm members is located at one end of said section body as a terminal arm member of said section body;
    said terminal arm member having an opening on the exterior surface thereof communicating with said tortuous passage and defining one end thereof;
    said sectional body having a base member located at the opposite end thereof and being at least partially hollow for defining the other end of said tortuous passage; and
    said air flow providing means comprising a rotary fan mounted within said bade member at the other end of said tortuous passage and operable upon rotation to exhaust air from the tortuous passage through said base member of said sectional body and outwardly thereof.

3. A robot as set forth in claim 1, wherein each of said plurality of pivotal joints includes a shaft as one of the components thereof and having a longitudinal axis about which another component of the pivotal joint is rotatable; and
    each of said shafts being provided with a bore hole at least partially extending therethrough and included as part of the uninterrupted tortuous passage extending through each of said pivotal joints and the arm members of said sectional body.

4. A robot as set forth in claim 3, further including
    a plurality of wiring cables extending through at least the interior of one of said arm members and arranged about the shaft included in the pivotal joint between said at least one arm member and an adjacent arm member;
    each of said plurality of wiring cables extending lengthwise with respect to said shaft and having a coiled portion arranged in offset relation to the coiled portions of the other wiring cables; and
    said coiled portions of said wiring cables providing enlarged areas on said wiring cables and serving as spacers between said shaft and the remaining portions of said wiring cables to limit frictional contact therebetween for minimizing the generation of particles from frictional wear.

5. A multi-jointed robot for use in a clean room where contaminant material must be eliminated to the extent possible, said robot comprising:
    a sectional body defined at least in part by a plurality of arm members;
    means including relatively movable components pivotably connecting adjacent arm members with respect to each other and providing a plurality of pivotal joints between respective arm members;
    said arm members and said pivotal joint being at least partially hollow to define an uninterrupted tortuous passage extending through each of said pivotal joints and the arm members of said sectional body;

one of said plurality of arm members being located at one end of said sectional body as a terminal arm member of said sectional body;

said terminal arm member having an opening on the exterior surface thereof communicating with said tortuous passage and defining one end thereof;

said sectional body having a base member located at the opposite end thereof and being at least partially hollow for defining the other end of said tortuous passage;

a rotary fan mounted within said base member at the other end of said tortuous passage and operable upon rotation to exhaust air from the tortuous passage through said base member of said sectional body and outwardly thereof to provide an air flow within the interior of said sectional body of said robot through said tortuous passage defined in said pivotal joints and said arm members pivotably connected thereby;

each of said plurality of pivotal joints including a shaft as one of the components thereof and having a longitudinal axis about which another component of the pivotal joint is rotatable;

each of said shafts being provided with a bore hole at least partially extending therethrough and included as part of the uninterrupted tortuous passage extending through each of said pivotal joints and the arm members of said sectional body;

a plurality of wiring cables extending through at least the interior of one of said arm members and arranged about the shaft included in the pivotal joint between said at least one arm member and an adjacent arm member;

each of said plurality of wiring cables extending lengthwise with respect to said shaft and having a coiled portion arranged in offset relation to the coiled portions of the other wiring cables; and said coiled portions of said wiring cables providing enlarged areas on said wiring cables and serving as spacers between said shaft and the remaining portions of said wiring cables to limit frictional contact therebetween for minimizing the generation of particles from frictional wear;

whereby contaminant particles if present due to frictional wear between moving components of said pivotal joints may be carried by the air flow along said tortuous passage within the interior of said sectional body of said robot to the exterior of said sectional body to remove said particles as a source of contamination.

* * * * *